United States Patent [19]

Asay et al.

[11] Patent Number: 5,537,450
[45] Date of Patent: Jul. 16, 1996

[54] ON-LINE ANALYSIS OF FUEL INTEGRITY

[75] Inventors: Roger H. Asay, Santa Clara, Calif.; Darrel L. Chase, Kingsville, Md.; M. Douglas McGinnis, Willow Street; Dennis L. Oltmans, Quarryville, both of Pa.; Marc S. Sattler, Elkton, Md.

[73] Assignee: Radiological & Chemical Technology, Inc., Santa Clara, Calif.

[21] Appl. No.: 189,311

[22] Filed: Jan. 31, 1994

[51] Int. Cl.⁶ ............................................. G21C 17/00
[52] U.S. Cl. ........................... 376/253; 376/251; 376/246
[58] Field of Search ................................. 376/251, 246, 376/253; 976/DIG. 209

[56] References Cited

U.S. PATENT DOCUMENTS

| | | | |
|---|---|---|---|
| 3,632,470 | 6/1972 | Rubin | 376/251 |
| 3,786,257 | 1/1974 | Weiss et al. | 250/83.3 R |
| 3,878,040 | 4/1975 | Martucci | 376/25.3 |
| 3,964,964 | 6/1976 | Fryer et al. | 376/253 |
| 4,057,466 | 11/1977 | Thompson et al. | 376/217 |
| 4,080,250 | 3/1978 | Howekamp et al. | 376/251 |
| 4,110,620 | 8/1978 | Womack | 250/361 R |
| 4,495,143 | 1/1985 | Gross et al. | 376/251 |
| 4,764,335 | 8/1988 | Gross et al. | 376/253 |

Primary Examiner—Donald P. Walsh
Assistant Examiner—Meena Chelliah
Attorney, Agent, or Firm—Fliesler, Dubb, Meyer & Lovejoy

[57] ABSTRACT

Failed fuel cladding in light water reactors can lead to premature reactor shutdown for removal of the failed fuel bundles from the core. The lost power and associated fuel replacement costs are astronomically high, approaching a million dollars per day in near term costs. Additionally, the long term affect on an operating plant are the release and distribution around the plant of long-lived fission products which increase radiation levels and impose increased radiological protection procedures. A method has been developed which allows for on-line early detection of failed fuel elements while the plant is operating through flowing off-gas through a conduit to a gamma spectrograph with a time delay to allow interfering short lived isotopes to decay and then analyzing for gamma radiation from at least one of the nuclides Kr-85m, Kr-87, Kr-88, Xe-133, Xe-135, Xe-135m and Xe-138. The implementation of this technology achieves significant cost savings for the operating utility and allows for continued operation for extended periods of time before the plant is shutdown for removal of the failed elements.

14 Claims, 6 Drawing Sheets

ON-LINE ANALYSIS OF FUEL INTEGRITY

DESCRIPTION

1. Technical Field

The invention relates to on-line analyzing of the integrity of individual fuel elements or bundles during operation of a nuclear powered electrical energy generating plant. More specifically, the invention relates to the use, without removal of samples, of gamma spectrography to analyze signals typical of failed fuel element gaseous fission products released to the primary reactor system.

2. Background of the Invention

If fuel cladding failures should occur during the operation of the nuclear reactor of a nuclear powered electrical energy generator there is a release of fission products to the primary heat exchange system. These fission products not only contaminate the reactor system, but the gaseous fission products can also be released to the environs via the plant off-gas system. If the failed fuel elements are allowed to remain in the reactor core and are used in the power production mode, the release of fission products typically keeps increasing and the plant must reduce power by deactivating the failed fuel elements and/or eventually shutdown to remove the fuel elements that have failed. Catastrophic failure of the fuel cladding will eventually take place if the failure mechanism is not ameliorated. This latter condition, referred to as "un-zippering", leads to release of nuclear (uranium/plutonium) fuel to the reactor internal components where it will continue to fission without containment of the fission products anytime the plant is operating. This is referred to as "recoil release".

Typically, when an operating plant first experiences a non-catastrophic fuel cladding failure, the plant power output is reduced to 60 to 80% of full power so that the plant can produce a guaranteed steady power output while shutting down some of the control cells so as to be able, by the process of elimination, to locate the control cell which contains the problem fuel bundle. A typical 1,000 Megawatt electricity producing plant would have of the order of 180 control cells each of which has four fuel bundles. To locate the problem, damping rods are inserted in selected of the control cells and samples of the reactor off-gases are drawn into containers and analyzed via gamma spectrography to determine the Xe-133 count until the cell (or cells) responsible for the problem is identified. Current operating plants have the capability of sampling the off-gas and determining the composition and characteristics of the fission gases that may be present. However, the process involves grab sampling and a timed decay of about 40 minutes before analysis. Significant and complicated calculations must be performed to back calculate to the initial amounts of radiation due to various nuclides because of their very different half-lives. Normally only about six such analyses can be run in a typical twenty-four hour day. Thus, it would generally take 30 days to test all of the control cells in such a power plant reactor. The number of analysis per shift can be increased by using several technicians but the costs of training so many technicians and having them available as needed can be quite significant. Also, the possibility of random errors is increased since not every technician will generally perform the task in an identical manner. A relatively long test period leads to increased occupational exposure of plant technicians and is not conducive to making more than a hundred analyses in a short period of time. This of course represents very significant cost penalties (on the order of thousands of dollars per hour as the plant continues to operate at a reduced power output) as well as creating radiological hazards within the plant (Replacement cost is about $10.00 per Megawatt hour. If the plant is only operating at 80% capacity then the power replacement must be 200 Megawatt hours which is equal to $10.00 times 200 or $2,000.00 per hour. If the plant is operating at only 60% capacity the power replacement cost is proportionately higher, namely, $4,000.00 per hour.)

A typical catastrophic fuel cladding failure will result in about 30,000 µCi of fission product gases being released per second. At these levels, it is almost imperative that the plant shutdown and perform a long and arduous task of examining the fuel bundles external to the reactor vessel. Once the leaking fuel bundle is found, it is then replaced and the fuel reloaded into the reactor. The economic impact on a typical 1,000 Megawatt electric utility is on the order of a million dollars per day under these circumstances.

DISCLOSURE OF THE INVENTION

In accordance with an embodiment of the invention an on-line method is set forth of detecting failed nuclear fuel elements. The method is useful with a nuclear reactor which has a plurality of control cells which contain nuclear fuel bundles and into which damping rods can be reciprocated to start, stop and control the rate of nuclear chain reaction. Such reactors producing an off-gas stream which includes, O-19, N-13, N-16, Kr-85m, Kr-87, Kr-88, Xe-133, Xe-135, Xe-135m and Xe-138 nuclides along with other gaseous species including other nobel gas isotopes. The method comprises flowing the off-gas stream from the reactor to a detecting cell of a gamma spectrograph. The flowing is for a time sufficient to reduce gamma radiation produced by O-19 and N-16 nuclides and to reduce Compton scattering produced by O-19, N-13 and N-16 nuclides sufficiently so that the magnitudes of the gamma radiation from at least one of Kr-85m, Kr-87, Kr-88, Xe-133, Xe-135, Xe-135m and Xe-138 nuclides can be determined in the gas cell. The spectrograph is of sufficiently high resolution to allow such determination.

In accordance with another embodiment of the invention a method is set forth of continuing to operate a nuclear reactor which exhibits one or more leaks indicative of non-catastrophic cladding failure. The method comprises determining the control cell or cells which are leaking in an on-line manner as set forth above while keeping the reactor in operation. The rods are then reciprocated into the leaking cell or cells sufficiently to alleviate the leak or leaks and reactor operation is continued. The total power output of the reactor is preferably increased to full operating capacity by increasing the withdrawal of rods from non-leaking control cells.

The present invention provides a method for rapidly analyzing the characteristics of minute amounts of fission products. The method involves utilization of on-line gamma spectrographic measurement of the off-gas stream. For the recoil situation wherein fissionable uranium is not contained within fuel elements (tramp from manufacture or from previous catastrophic fuel failures) a characteristic pattern with regard to the amount and type of fission products is observed. Similarly, for large releases from fuel pellets within the clad through larger openings (diffusion through the cladding) and pin-hole leakage (equilibrium release) both have different but distinct characteristic concentration patterns. These patterns are conventionally determined by plotting concentration (or counts), A, vs. concentration divided by λ times the fission yield, Y, wherein λ is the natural logarithm of 1/half-life. For recoil the slope is zero while for diffusion and for equilibrium release different non-zero slopes result. FIG. 6 illustrates such a plot. The method is described in "A COMPARISON OF FISSION PRODUCT RELEASE STUDIES IN LOOPS AND THE VBWR" by F. J. Brutsehy, which was presented in February, 1961 at the Tripartite Conference on Transport of Materials in Water Systems and was predistributed (by General Electric Company, Atomic Power Equipment Department, Vallecitos Atomic Laboratory, Pleasanton, Calif.) on Jan. 21, 1961. Once the characteristics of the fission products in the off-gas stream is known, the source control cell can be identified by conventional analytical procedures typically used in the nuclear industry, namely, by determining the effect on the gamma spectrograph of the reciprocation of known control rods within the reactor. In order to achieve the required accuracy and detection capability, an appropriate sample flowing and spectrograph measuring methodology is disclosed as is an appropriate gamma spectrograph cell. Neither of these currently exist in operating power reactor stations.

The present invention for the first time provides for a methodology to quickly and accurately analyze fuel bundle integrity for early on-line detection of small leaks while the plant is operating. Over fifty samples can be analyzed on-line in a typical twenty-four day. The working example set forth below demonstrates the analysis of 185 samples in a 60 hour period which would correspond to over seventy samples being analyzed in a twenty-four hour day. In this way, defective control cells can be quickly located and then isolated from the power generation sector of the core (by insertion of the corresponding rods) and the plant can remain on line at full power (the power output of the remaining cells can usually, in practice, be increased sufficiently to make up for the power lost by deactivating only a few of the control cells) for an extended period of time. Furthermore, once the failed fuel bundle is isolated from the power regime, it is cooled to the primary water temperature rather than the very high fission temperatures and the cladding stress is much relieved. Therefore, the probability for "un-zippering" and cataclysmic release of fission products is nearly eliminated. The defective cell or cells can be replaced during the normal downtime which is needed to replace spent and defective fuel bundles with fresh fuel bundles. Spent and defective fuel bundles are replaced on the average about once every eighteen months.

BRIEF DESCRIPTION OF DRAWINGS

The invention will be better understood by reference to the figures of the drawings wherein like numbers denote like parts throughout and wherein.

BEST MODE FOR CARRYING OUT INVENTION

The present invention is concerned with appropriate on-line sampling methodology and sample analysis by gamma spectrography with the nuclear electrical power plant remaining in service. This is accomplished by diverting a portion of the off-gas from the reactor, generally from downstream of the condenser, through a bypass line and through a sample cell which is scanned by a gamma spectrograph. The off-gas is then generally recombined with the system off-gas wherefrom it can be safely disposed of. It is also possible to dispose of the sampled off-gas separately but this would require an additional source of vacuum and extra hazardous materials handling.

Figure 1:
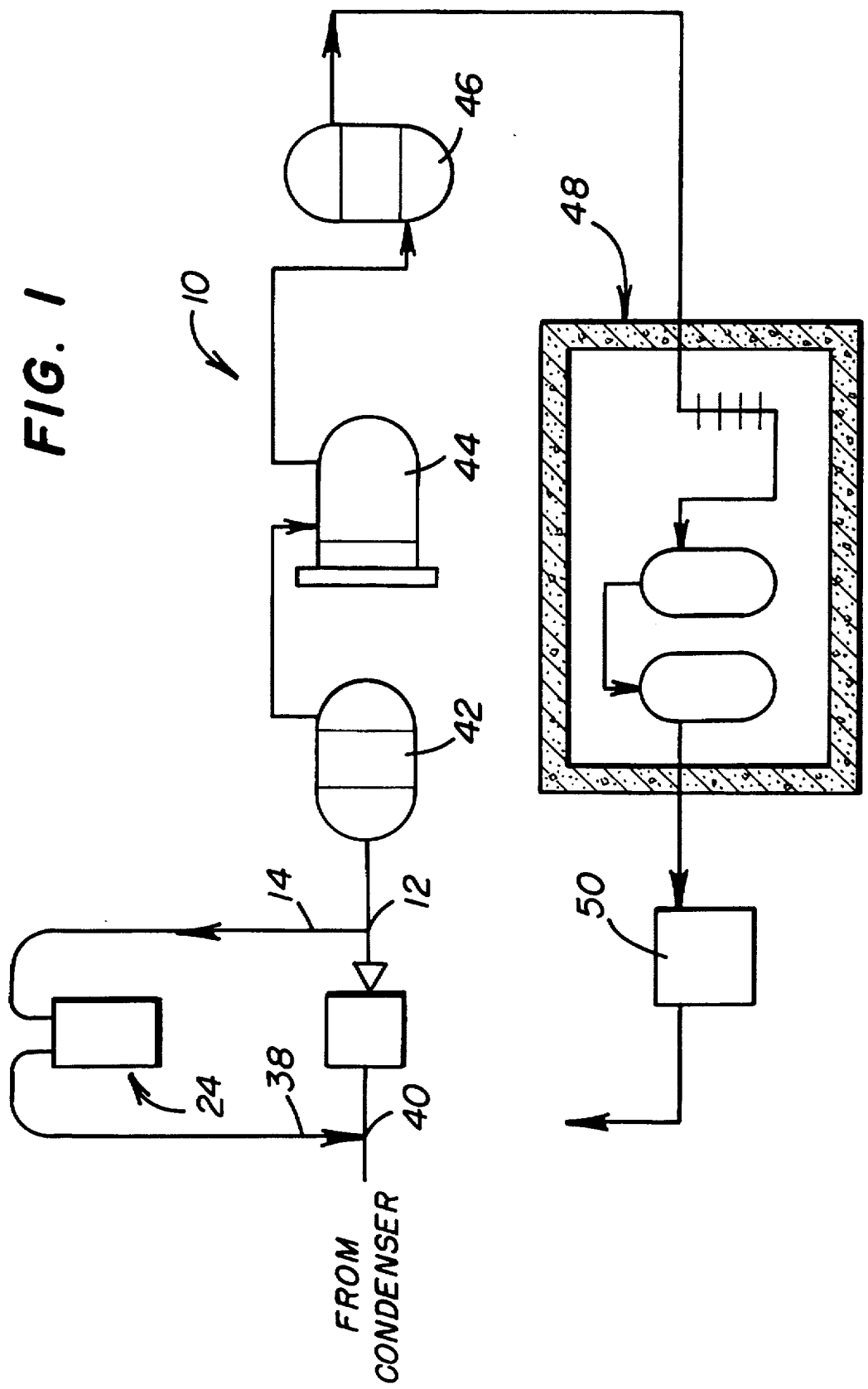
FIG. 1 illustrates, schematically, a low-temperature off-gas system for a nuclear reactor, and an appropriate location for diverting flow of a sample of off-gas from the main off-gas stream to flow through a gamma spectrograph along with an appropriate location for combining the sample again with the off-gas.
Figure 2:
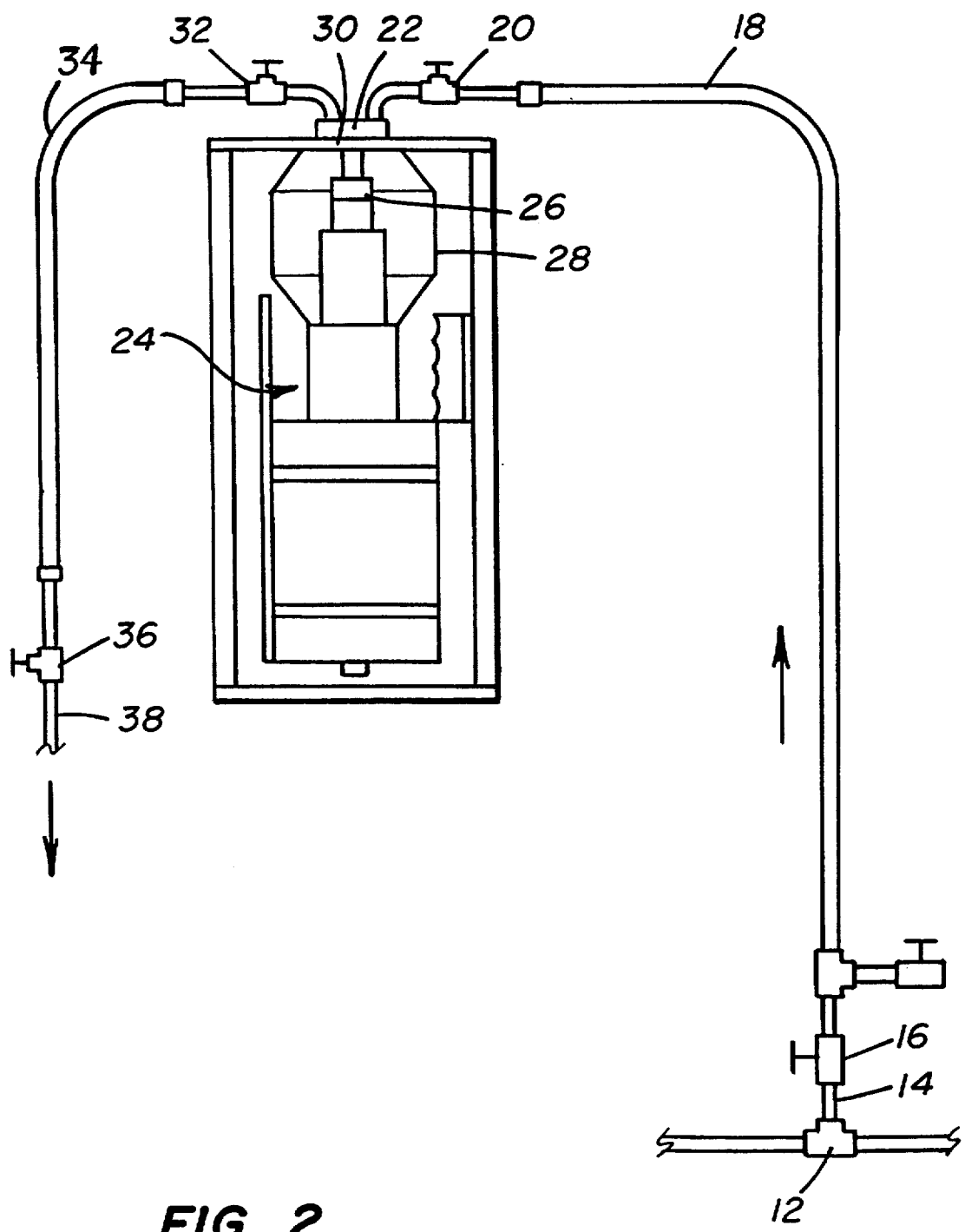
FIG. 2 illustrates, schematically, details of the sample cell of the spectrograph and its attachment to the low-temperature off-gas system shown in FIG. 1.

Reference to FIGS. 1 and 2 will illustrate operation of the invention. A portion of off-gas is diverted from the off-gas system 10 from an appropriate position 12 selected to provide a desired delay time before measurement. The off-gas portion passes via a line 14, a valve 16, a line 18 and a valve 20 to a sample (measuring) chamber 22 of a gamma spectrograph 24. The spectrograph 24 has a detector 26 and is shielded by a wall structure 28. A thin wall 30, the wall being thin enough so that at least about 30%, preferably at least about 40%, more preferably at least about 70% and most preferably about 95% of the Xe-133 gamma radiation will penetrate it, separates the off-gas from physical contact with the detector 26. The off-gas can be retained for a short time in the sample chamber 22 by manipulating an exit valve 32 but a flow through procedure is preferred as it is faster and equally accurate. The off-gas flows through the exit valve 32 and is returned via line 34, valve 36 and line 38 to an appropriate position 40 in the off-gas system 10. All of the off-gas is then decontaminated together and vented to the atmosphere via recombiner 42, cooler/condenser 44, desiccant dryer/short term holdup 46, low temperature vault/charcoal absorber section 48 and filter 50. Note that details of the off-gas treatment will vary from plant to plant.

If desired the valves 20 and 32 can be closed to isolate the sample and the sample can be allowed to decay for a desired time period, for example, the eliminate any interference from short lived species such as N-13. Such a procedure might be used in the case of very small leaks if the indications from the flowing testing is inconclusive but questionable as to fuel integrity. The sample can be measured in this manner after two, or more, different decay times to increase detectability of small leaks.

It is essential to the practice of the invention that the time of flow to the sample be controlled so that interfering gamma radiation from relatively rapidly decaying species be reduced to a sufficient extent so that it is possible to obtain a gamma spectrograph of the more slowly decaying Kr-85m, Kr-87, Kr-88, Xe-133, Xe-135, Xe-135m and Xe-138 nuclides so that the relative magnitudes of the gamma radiation due to at least one of these nuclides can be determined, with the emphasis being on the low energy Xe-133 gamma radiation. The time of flow from the release of the off-gas from the fuel in the core to the sample cell should be at least about 2 minutes, more preferably at least about 2.5 minutes, and more preferably yet at least about 3 minutes and is suitably restricted to fall within a range from about 3 to about 30 minutes, more preferably from about 3 minutes to about 15 minutes. Overly long flow times are not desirable since the resulting data will have to be corrected for the different half-lives of the constituent gases so as to back calculate to the original sample constituency. The appropriate flow rate for achieving this will vary depending upon tubing diameters, materials, sample cell volume and other factors. Typically, the flowrate will fall between about 1 and about 30 cubic feet per hour.

To achieve this, a specially designed sample chamber as described above was developed which allows for the weaker gamma emitters such as the Xe-133, Xe-135, Xe-135m and Xe-138 nuclides to be measured with high resolution without sacrificing analytical accuracy. Thus, the sample analysis chamber must be made with strong yet low density material, such as aluminum, titanium, magnesium or alloys of these metals, which do not give off an interfering x-ray. Simultaneously, the sample should be taken at a location and at proper flowrates which allow an appropriate amount of hold up (The half-lives of high energy emitters and/or Compton scatterers such as the O-19 and N-16 nuclides are of the order of seconds, specifically, 26.8 seconds and 7.1 seconds, respectively while the half-lives of the Xe species are from hours to at least days. N-13 has a half-life of 9.97 minutes but is not a gamma emitter. N-13 does emit at 0.511 MeV but this is outside of the range of interest) so that the high energy, short-lived nuclides do not overshadow the analyses. A sampling chamber containing from 25 to 300 cubic centimeters of flowing off-gas sample has been found to work well in carrying out the method of the invention.

For determination of the failure mechanism and location of the failed elements, samples are taken following reciprocating (either full or partial inserting or withdrawing) of the control or damping rod within a cell containing typically four fuel bundles. When a control rod is exercised (reciprocated) in a cell which contains a failed fuel element, the gaseous fission product release rate changes significantly. These fission products are primarily radionuclides of xenon and krypton gases. Specifically, the relative magnitude of at least one of the Kr-85m, Kr-87, Kr-88, Xe-133, Xe-135, Xe-135m and Xe-138 nuclides must be determined in order to assess fuel element leakage, with the emphasis on the low energy but high signal strength Xe-133 and on the ratio of Xe-133 to Xe-138 which provide particularly strong signals and/or signal ratio changes in such eventualities. The Xe-135 and Xe-135m nuclides are also useful for making the necessary determination. It should be noted that other nobel gas isotopes will also provide gamma radiation. Such radiation is non-interfering.

Figure 3:
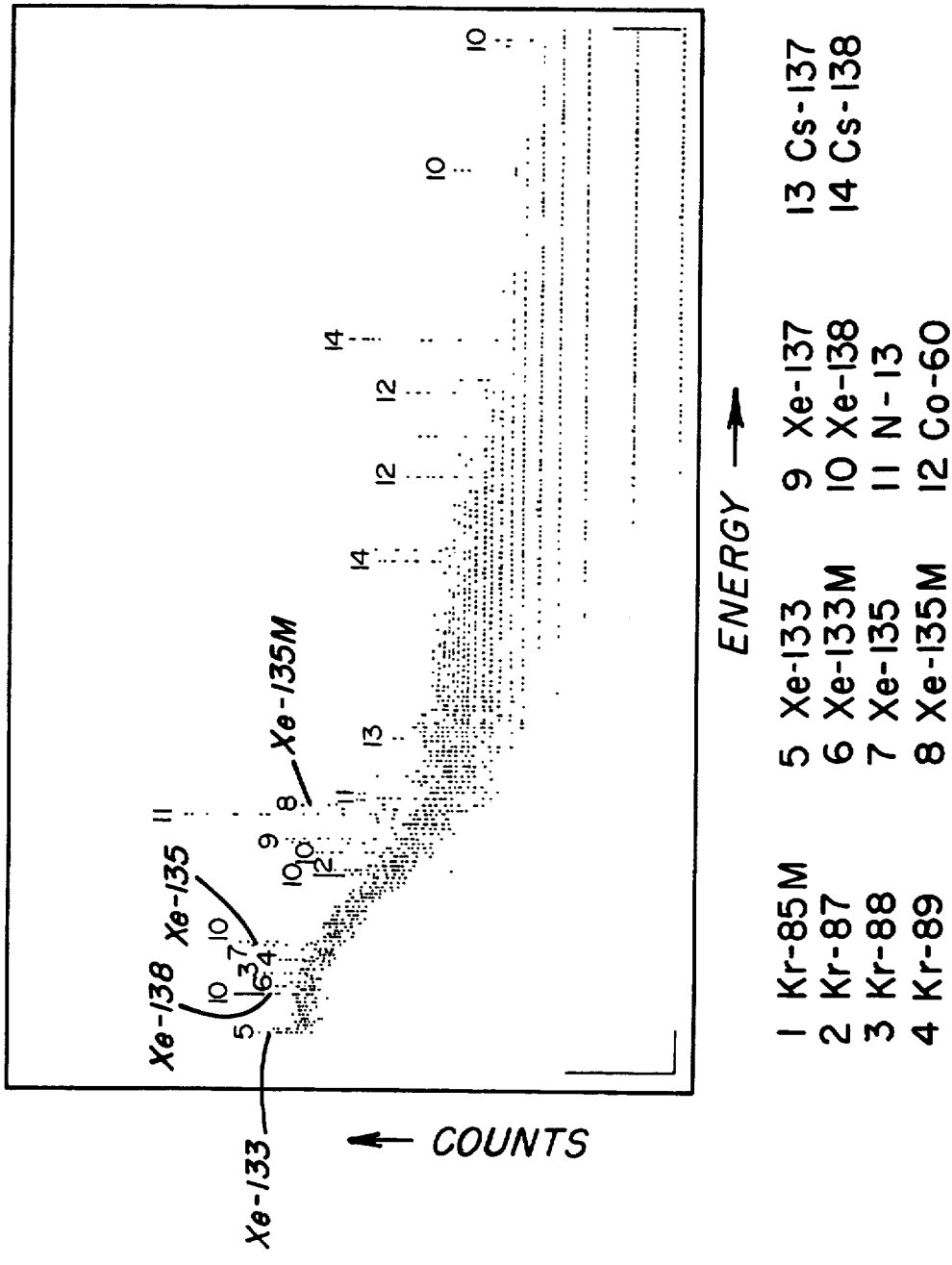
FIG. 3 illustrates, graphically, a gamma spectrograph obtained on a sample and shows the typical pattern which results when there are no cladding defects or when a control rod has been exercised in the leaking control cell of the power plant which previously exhibited the gamma spectrograph of FIG. 4.
Figure 4:
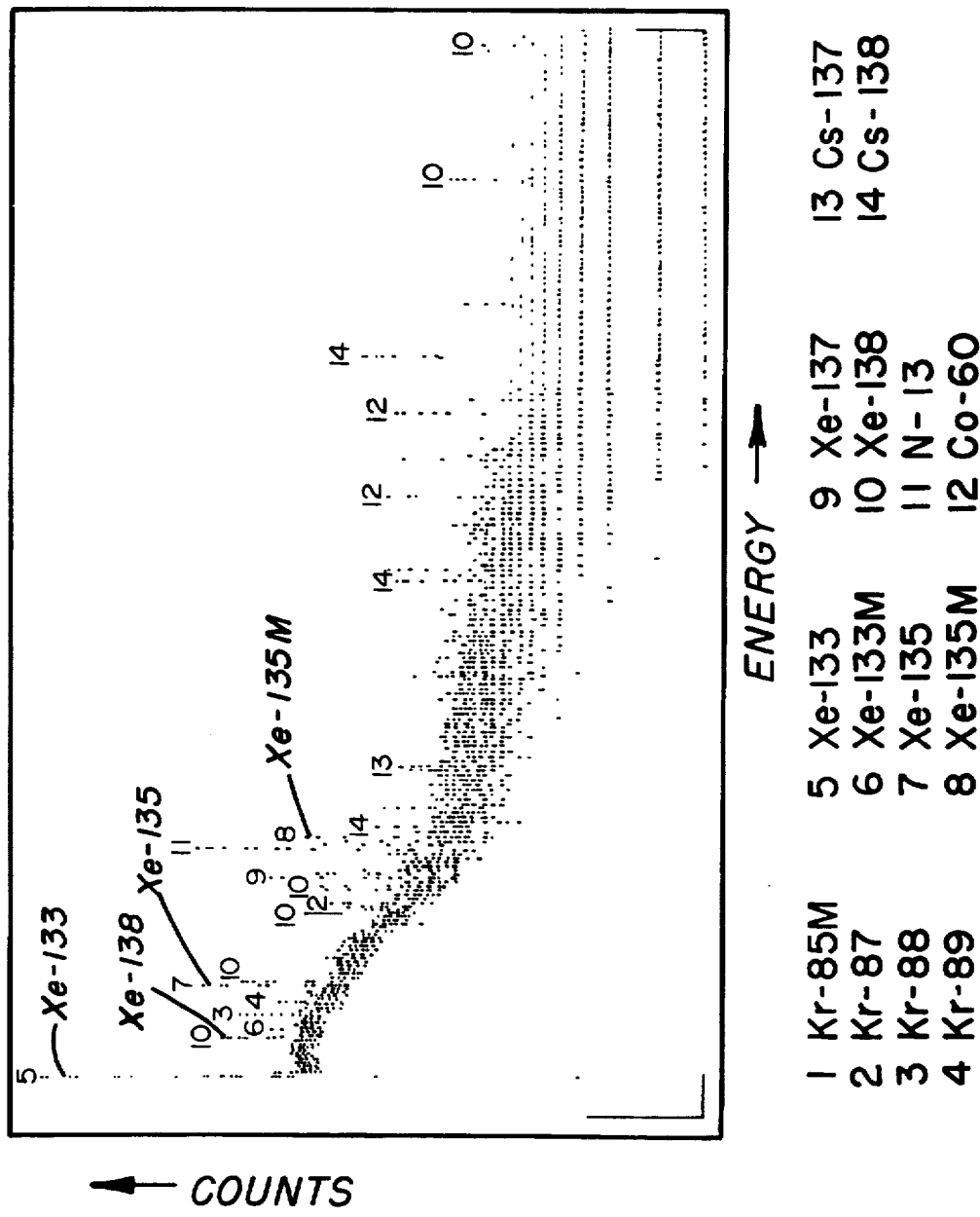
FIG. 4 illustrates, graphically, a gamma spectrograph obtained on a sample and shows the typical pattern which results when a rod cladding failure has occurred.

FIGS. 3 and 4 may be compared to observe the very different gamma spectrographs which result in the case of no leaks (FIG. 3) (The spectrograph of FIG. 3 also results if a leak has been alleviated by reciprocating a control rod into the leaking cell) and leaks (FIG. 4). Note in particular the size of the signal attributable to Xe-133, i.e., that it is very large when a leak is present and relatively small in the absence of a leak.) Although it is not as obvious from the peak sizes of the Xe-135, Xe-135m and Xe-138 peaks there is a significant enough change in intensity of these peaks to use them for identifying cells which are leaking. Also, the ratio of the Xe-133 peak to the Xe-138 peak appears to provide an even larger change in signal than is noted with the Xe-133 peak alone.

During the development for the present invention, a study was performed at an operating boiling water reactor (BWR) plant that was suspected to have leaking fuel. The existing off-gas sample lines were analyzed by gamma spectrography to determine which nuclides could be detected and which were interfering. In addition, hold up times, sample flowrates and sample volume parameters were determined during this feasibility testing.

The main interfering nuclides were found to be activation products of oxygen and nitrogen which are inherently present in a BWR primary system. The oxygen activates under neutron irradiation to O-19 and N-16 and both have interfering gamma energies plus creating a great deal of Compton scattering (which leads to low energy high background counting levels) which can overshadow the measurement of low energy gamma rays. These nuclides are short-lived, however, and can be dealt with by selecting proper flowrate and sampling parameters.

The sample piping itself also imposes limitations on detectability of the low energy nuclides of interest in that the wall thickness, even though quite thin, was found to attenuate most of the low energy Xe-133 gamma rays. The attenuation coupled with Compton scatter radiation and x-rays all within the same energy level of this nuclide make analysis very difficult.

Once the above data was evaluated, a sampling point was selected which had a more favorable hold up time to allow for decay of the short-lived O-19 and N-16 nuclides. A corresponding sample flowrate was selected so that a reasonably short time would exist between release of off-gas from the fuel in the core and analyses. A long time would be undesirable as it is important to perform the analysis in as short a time as possible so as to allow the plant to be returned to full operation with the least loss in operation. A specially fabricated sample chamber with an appropriate volume and thin aluminum (magnesium, titanium or alloys of these metals would also have been suitable) counting window was used within the shielding of a high purity germanium or lithium drifted germanium gamma detector for analyzing the sample on a continuous basis. Thus, the problem with attenuation of the low energy gamma rays was minimized and an adequate, but not overburdening in terms of total activity, volume of sample was available for analysis.

The system as developed incorporates a shielded high purity germanium detector for eliminating stray radiation from other sources in the power plant. This is necessary as the nuclides of interest also contribute to Compton scattering and increase the overall count rate. The shielding also serves to reduce external background radiation. The shield itself is suitably, but not necessarily, lined with a material such as copper, to absorb secondary x-rays from the shielding material. Suitably, the detector can have an attenuation factor of 500 or greater for gamma rays of 1.33 MeV.

EXAMPLE

The system was set up at the same BWR mentioned previously for analysis of the total core. The reactor in the plant had 185 control cells containing four (4) fuel bundles each. Therefore, a sequence was designed so that the cells more likely to have cladding failure in the high power central region of the core were sampled first on a cell-by-cell basis. Following this, pairs of control cells were analyzed and then groups of four cells from the low power perimeter of the core were analyzed. This scenario allowed for the project to be completed within about 60 hours. The fact that this could be accomplished in so little time is of extreme importance as the plant power had to be reduced to about 60% output during the testing to allow for the insertion and withdrawal of the control rods without major perturbations of the plant generator. By minimizing the time to perform the testing, the replacement power costs are minimized.

Figure 5:
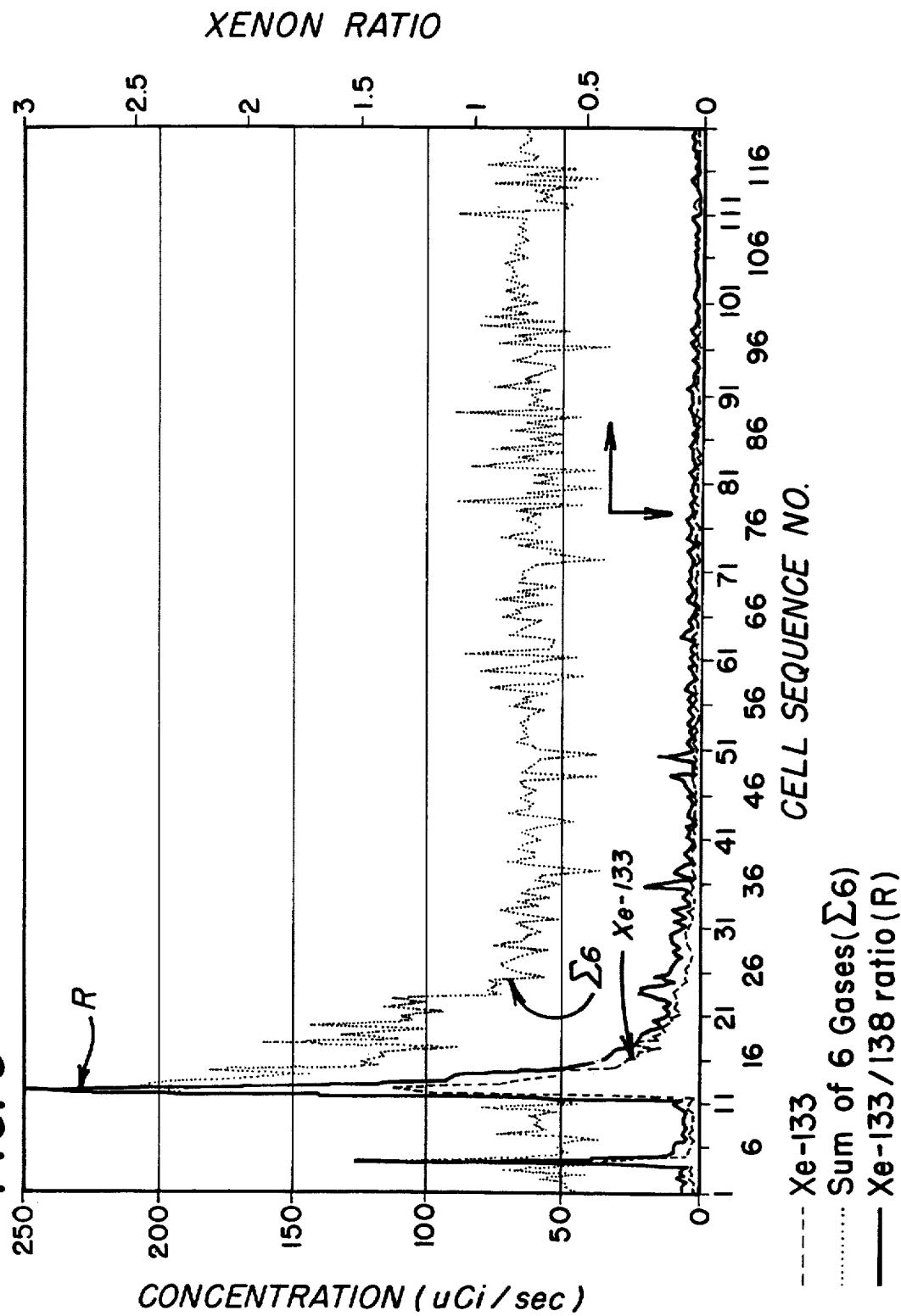
FIG. 5 illustrates, graphically, the detection of leaks in two cells of a nuclear reactor utilizing the method of the invention.
Figure 6:
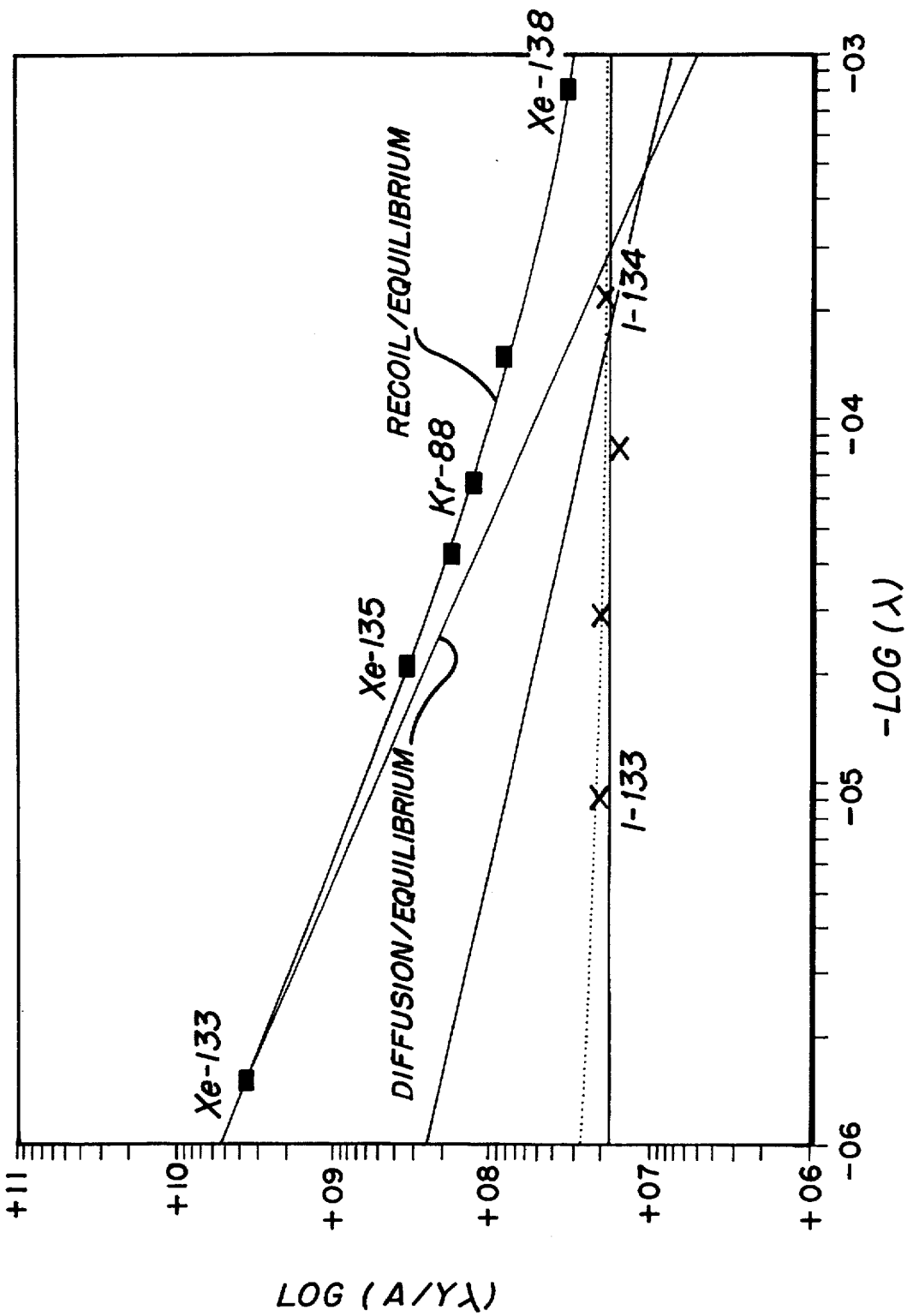
FIG. 6 illustrates, graphically, the different slopes which result in a ln(A/Yλ) vs. lnλ plot from recoil, diffusion/equilibrium and recoil/equilibrium events.

The test was successful in identifying two (2) leaking fuel elements with a high degree of confidence based upon differences in the magnitude of the Xe-133 gamma signal and upon the ratio of the Xe-133 gamma signal to the gamma signal attributable to Xe-138. The signals observed from the leaking fuel elements were between one and two orders of magnitude higher than the baseline level. Even though the leaking elements were located almost immediately, the entire core was analyzed to confirm the accuracy and sensitivity of the methodology and equipment. FIG. 5 illustrates plotting of three types of count data as against the cell being measured. The data plotted are 1) the intensity of the Xe-133 peak, 2) the ratio of the intensity of the Xe-133 peak to the intensity of the Xe-138 peak and 3) the sum of six different peaks, namely, those attributable to Xe-133, Xe-135, Xe-138, Kr-85m, Kr-87 and Kr-88. Using the prior procedure and analyzing even twelve (12) samples per twenty-four hour day would have taken about 15 days (about 360 hours). At about $4,000.00 per hour replacement power costs this would amount to a difference of about $1.2 million dollars (360−60=300×$4,000.00=$1,200,000.00).

The plant had been limited to approximately 80% power with the unidentified leaking bundles. Once the leaking fuel was located, the control rod pattern was appropriately adjusted so that the plant could resume full 100% power operation. The net savings to the operating utility is on the order of $2,000.00 per hour and the costs associated with an unscheduled forced outage of two to three weeks was avoided.

INDUSTRIAL APPLICABILITY

The invention is useful to reduce downtime and optimize power output of nuclear powered electrical power generators.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An on-line method of detecting failed nuclear fuel elements in an operating water cooled nuclear reactor having a plurality of control cells which contain nuclear fuel bundles and into which damping rods can be reciprocated to start, stop and control the rate of nuclear chain reaction, the reactor producing an off-gas stream which, in the case of the existence of one or more failed nuclear fuel elements, includes O-19, N-13, N-16, Kr-85m, Kr-87, Kr-88, Xe-133, Xe-135, Xe-135m and Xe-138 nuclides, comprising, while the reactor continues to operate:

a) flowing the off-gas stream from the reactor to a detecting cell of a gamma spectrograph, the flowing being for a time sufficient to reduce gamma radiation produced by O-19 and N-16 nuclides and to reduce Compton scattering produced by O-19, N-13 and N-16 nuclides sufficiently so that the magnitudes of the gamma radiation from at least one of the Kr-85m, Kr-87, Kr-88, Xe-133, Xe-135, Xe-135m and Xe-138 nuclides can be determined in the gas cell, the spectrograph being of sufficiently high resolution to allow such determination; and b) determining the magnitude of the gamma radiation from the at least one of the Kr-85m, Kr-87, Kr-88, Xe-133, Xe-135, Xe-135m and Xe-138 nuclides in the off-gas stream; and further including, when the magnitude of the gamma radiation from one or more of the Kr-85m, Kr-87, Kr-88, Xe-133, Xe-135, Xe-135m and Xe-138 nuclides is such as to indicate the existence of failed cladding among one or more of the fuel cells, the steps of, while the reactor continues to operate:

c) reciprocating damping rods in a selected subset of the fuel cells sufficiently so as to change the rate of nuclear chain reaction of the selected subset;

d) repeating the flowing and determining steps;

e) designating other fuel cells as the selected subset and repeating steps c) and d) until the effect of the reciprocation of the damping rods in the selected subset on the magnitude of the gamma radiation from the at least one of the Kr-85m, Kr-87, Kr-88, Xe-133, Xe-135, Xe-135m and Xe-138 nuclides in the off-gas stream indicates that a member cell of the selected subset exhibits failed cladding.

2. A method as set forth in claim 1, further including, while the reactor continues to operate:

f) maintaining a damping rod of the member cell reciprocated into the member cell of the selected subset which exhibits failed cladding sufficiently to stop nuclear chain reaction of the member cell.

3. A method as set forth in claim 2, wherein in step b) the at least one of the Kr-85m, Kr-87, Kr-88, Xe-133, Xe-135, Xe-135m and Xe-138 nuclides comprises the Xe-133 nuclide.

4. A method as set forth in claim 3, wherein in step b) the magnitude of the Xe-138 nuclide is also determined and wherein a marked increase in the ratio of the magnitude of gamma radiation attributable to Xe-133 to that attributable to Xe-138 is used as an indicator of failed cladding.

5. A method as set forth in claim 1, wherein in step b) the at least one of the Kr-85m, Kr-87, Kr-88, Xe-133, Xe-135, Xe-135m and Xe-138 nuclides comprises the Xe-133 nuclide.

6. A method as set forth in claim 5, wherein in step b) the magnitude of the Xe-138 nuclide is also determined and wherein a marked increase in the ratio of the magnitude of gamma radiation attributable to Xe-133 to that attributable to Xe-138 is used as an indicator of failed cladding.

7. A method as set forth in claim 1, wherein in step b) the at least one of the Kr-85m, Kr-87, Kr-88, Xe-133, Xe-135, Xe-135m and Xe-138 nuclides comprises the Xe-133 nuclide.

8. A method as set forth in claim 7, wherein in step b) the magnitude of the Xe-138 nuclide is also determined and wherein a marked increase the ratio of the magnitude of gamma radiation attributable to Xe-133 to that attributable to Xe-138 is used as an indicator of failed cladding.

9. A method as set forth in claim 1, wherein the time sufficient to reduce gamma radiation produced by O-19 and N-16 nuclides and to reduce Compton scattering produced by O-19, N-13 and N-16 nuclides sufficiently so that the magnitudes of the gamma radiation from Kr-85m, Kr-87, Kr-88, Xe-133, Xe-135, Xe-135m and Xe-138 nuclides can be determined in the gas cell falls within a range from about 3 to about 30 minutes.

10. A method as set forth in claim 1 wherein the flowing of step a) is at a flowrate between about 1 and about 30 cubic feet per hour.

11. A method of continuing to operate an operating water cooled nuclear reactor having a plurality of control cells which contain nuclear fuel bundles and into which damping rods can be reciprocated to start, stop and control the rate of nuclear chain reaction, the reactor producing an off-gas stream which, in the case of the existence of one or more failed clad nuclear fuel elements, includes O-19, N-13, N-16, Kr-85m, Kr-87, Kr-88, Xe-133, Xe-135, Xe-135m and Xe-138 nuclides, the reactor exhibiting one or more leaks indicative of non-catastrophic cladding failure, comprising, while the reactor continues to operate:

a) flowing the off-gas stream from the reactor to a detecting cell of a gamma spectrograph, the flowing being for a time sufficient to reduce gamma radiation produced by O-19 and N-16 nuclides and to reduce Compton scattering produced by O-19, N-13 and N-16 nuclides sufficiently so that the magnitudes of the gamma radiation from at least one of the Kr-85m, Kr-87, Kr-88, Xe-133, Xe-135, Xe-135m and Xe-138 nuclides can be determined in the gas cell, the spectrograph being of sufficiently high resolution to allow such determination;

b) determining the magnitude of the gamma radiation from the at least one of the Kr-85m, Kr-87, Kr-88, Xe-133, Xe-135, Xe-135m and Xe-138 nuclides in the off-gas stream;

c) reciprocating damping rods in a selected subset of the fuel cells sufficiently so as to change the rate of nuclear chain reaction of the selected subset;

d) repeating the flowing and determining steps;

e) designating other fuel cells as the selected subset and repeating steps c) and d) until the effect of the reciprocation of the damping rods in the selected subset on the magnitude of the gamma radiation from the at least one of the Kr-85m, Kr-87, Kr-88, Xe-133, Xe-135, Xe-135m and Xe-138 nuclides in the off-gas stream indicates that a member cell of the selected subset exhibits failed cladding;

f) reciprocating the appropriate rods into the leaking cell or cells sufficiently to alleviate the leak or leaks; and g) continuing operation of the reactor thereafter.

12. A method as set forth in claim 11, further including:

increasing the degree of withdrawal of rods from non-leaking control cells to increase the amount of power being generated by the reactor.

13. A method as set forth in claim 12, wherein the increasing is sufficient so that the reactor is operating at substantially full power.

14. A method of detecting failed cladding in a nuclear reactor comprising determining the ratio, in an off-gas stream from the reactor, of the magnitude of gamma radiation attributable to Xe-133 to that attributable to Xe-138.

* * * * *

US005537450C1

(12) EX PARTE REEXAMINATION CERTIFICATE (5319th)

United States Patent
Asay et al.

(10) Number: US 5,537,450 C1
(45) Certificate Issued: Apr. 4, 2006

(54) ON-LINE ANALYSIS OF FUEL INTEGRITY

(75) Inventors: Roger H. Asay, Santa Clara, CA (US); Darrel L. Chase, Kingsville, MD (US); M. Douglas McGinnis, Willow Street, PA (US); Dennis L. Oltmans, Quarryville, PA (US); Marc S. Sattler, Elkton, MD (US)

(73) Assignee: Radiological & Chemical Technology, Inc., Santa Clara, CA (US)

Reexamination Request:
No. 90/006,654, May 28, 2003

Reexamination Certificate for:
Patent No.: 5,537,450
Issued: Jul. 16, 1996
Appl. No.: 08/189,311
Filed: Jan. 31, 1994

(51) Int. Cl.
*G21C 17/00* (2006.01)

(52) U.S. Cl. .................. 376/253; 376/246; 376/250; 376/251

(58) Field of Classification Search ............... 376/246, 376/250, 251, 253
See application file for complete search history.

(56) References Cited

U.S. PATENT DOCUMENTS

| 3,207,668 | A | | 9/1965 | West | |
|---|---|---|---|---|---|
| 3,376,200 | A | * | 4/1968 | Ward | 376/245 |
| 3,617,709 | A | * | 11/1971 | Tone | 250/379 |
| 3,663,363 | A | | 5/1972 | Crouthamel et al. | 376/251 |
| 3,959,069 | A | * | 5/1976 | McCormick | 376/251 |
| 4,080,250 | A | * | 3/1978 | Howekamp et al. | 376/251 |
| 4,092,541 | A | | 5/1978 | Neidl | 250/364 |
| 4,107,533 | A | * | 8/1978 | Tabuchi et al. | 376/245 |
| 4,532,103 | A | * | 7/1985 | Kitaguchi et al. | 376/245 |
| 2002/0084420 | A1 | * | 7/2002 | Kitaguchi et al. | 250/370.01 |

FOREIGN PATENT DOCUMENTS

| EP | 0012061 | * | 12/1982 |
|---|---|---|---|
| HU | 36606 | * | 9/1985 |
| JP | 62-006199 | * | 1/1987 |
| JP | 03-138593 | * | 6/1991 |

OTHER PUBLICATIONS

Beslu, "Description of a Method to Determine the Characteristics of Defective Fuels from Water Activity Measurement: Comparison with Experimental Results", May 1980, pp. 63–70, International Atomic Energy Agency, Vienna, Austria.

Guidebook on Non–Destructive Examination of Water Reactor Fuel, 1991 pp. 2–6, International Atomic Energy Agency, Vienna, Austria.

Lundholm, "ABB Atom Fuel Failure—An Overview", Jun. 1993, pp. 57–63, International Atomic Energy Agency, Vienna, Austria.

* cited by examiner

Primary Examiner—Jack Keith

(57) ABSTRACT

Failed fuel cladding in light water reactors can lead to premature reactor shutdown for removal of the failed fuel bundles from the core. The lost power and associated fuel replacement costs are astronomically high, approaching a million dollars per day in near term costs. Additionally, the long term affect on an operating plant are the release and distribution around the plant of long-lived fission products which increase radiation levels and impose increased radiological protection procedures. A method has been developed which allows for on-line early detection of failed fuel elements while the plant is operating through flowing off-gas through a conduit to a gamma spectrograph with a time delay to allow interfering short lived isotopes to decay and then analyzing for gamma radiation from at least one of the nuclides Kr-85m, Kr-87, Kr-88, Xe-133, Xe-135, Xe-135m and Xe-138. The implementation of this technology achieves significant cost savings for the operating utility and allows for continued operation for extended periods of time before the plant is shutdown for removal of the failed elements.

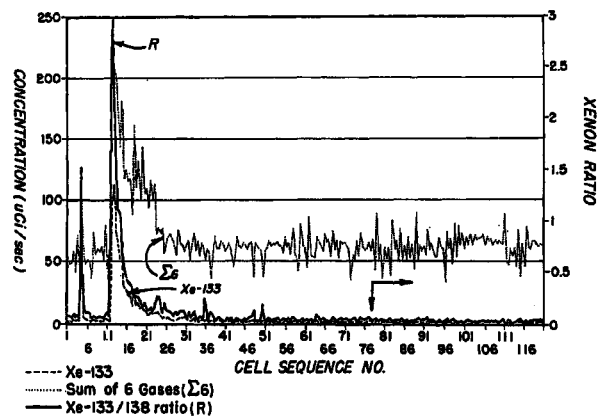

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 is confirmed.

Claim 14 is determined to be patentable as amended.

New claims 15–26 are added and determined to be patentable.

14. A method of detecting failed cladding in a *boiling water* nuclear reactor comprising
*spectrographically* detecting radiation from a *flowing-through portion of an* off-gas stream from the reactor and from said detecting, determining the ratio, in [an] *the flowing* off-gas stream [from the reactor] *portion*, of the magnitude of gamma radiation attributable to Xe-133 to that attributable to Xe-138.

15. *The method of claim 14 and further wherein:*
*said flowing-through portion of the off-gas stream has a flow delay time from the reactor of no more than about 15 minutes; and*
*said flowing-through portion of the off-gas stream includes N-13 nuclides.*

16. *The method of claim 14 and further wherein:*
*said flowing-through portion of the off-gas stream has a flow delay time from the reactor of at least about 3 minutes but no more than about 15 minutes; and*
*said flowing-through portion of the off-gas stream includes O-19 nuclides.*

17. *The method of claim 14 and further wherein:*
*said flowing-through portion of the off-gas stream has a flow delay time from the reactor of at least about 2 minutes but no more than about 15 minutes; and*
*said flowing-through portion of the off-gas stream includes at least one of O-19 nuclides and N-16 nuclides; and*
*the flowing-through portion of the off-gas stream has been sufficiently time-delayed in its flow from the reactor to the point of said spectrographic detection of radiation therefrom so that Compton scattering effects from the O-19 or/and N-16 nuclides are reduced such that relative magnitudes can be more accurately determined by said spectrographic detection of the gamma radiation attributable to Xe-133 and the gamma radiation attributable to Xe-138.*

18. *The method of claim 14 and further wherein:*
*said flowing-through portion of the off-gas stream has a flowrate of at least about 1 cubic foot per hour.*

19. *The method of claim 14 and further wherein:*
*said flowing-through portion of the off-gas stream has a flowrate in the range of about 1 cubic foot per hour to about 30 cubic feet per hour.*

20. *The method of claim 19 and further wherein:*
*said flowing-through portion of the off-gas stream flows through a radiation detecting cell having a volume in the range of 25 to 300 cubic centimeters.*

21. *The method of claim 14 and further comprising:*
*determining from said spectrographically detecting, the relative magnitude of radiation attributable to Xe-135.*

22. *The method of claim 14 and further comprising:*
*temporarily halting the flow of said flowing-through portion of the off-gas stream so as to allow for a longer decay time for nuclides in the halted portion and to allow for spectrographically detecting of radiation from the halted portion.*

23. *The method of claim 14 and further wherein:*
*said spectrographic detecting includes flowing the portion of the off-gas stream by a thin containment wall where the wall is sufficiently thin to allow at least about 30% of gamma radiation from Xe-133 to pass through the wall.*

24. *The method of claim 23 further wherein:*
*said wall is sufficiently thin to allow at least about 70% of gamma radiation from Xe-133 to pass through the wall.*

25. *The method of claim 14 and further comprising:*
*returning the flowing-through portion of the off-gas stream to a position in an off-gas processing system of the reactor so that the returned portion will be decontaminated by the off-gas processing system and vented thereafter to the atmosphere.*

26. *An on-line method of detecting and identifying failed nuclear fuel elements in an operating, boiling water type of water cooled nuclear reactor plant, where the plant's reactor has a plurality of control cells which contain nuclear fuel bundles and into which damping rods can be reciprocated to start, stop and control the rate of nuclear chain reaction, the reactor producing an off-gas stream which flows within confines of the reactor's plant and which, in the case of the existence of one or more failed nuclear fuel elements, includes O-19, N-13, N-16, Kr-85m, Kr-87, Kr-88, Xe-133, Xe-135, Xe-135m and Xe-138 nuclides, the method comprising, while the reactor and plant continue to operate:* a) *flowing the off-gas stream from the reactor to a detecting cell of a gamma spectrograph, where the detecting cell is located in-situ within confines of the reactor's plant, where the spectrograph produces information correlating radiation energy levels detected by the detecting cell to number of counts detected by the detecting cell, where the flowing is for a time sufficient to reduce gamma radiation produced by O-19 and N-16 nuclides and to reduce Compton scattering produced by O-19, N-13 and N-16 nuclides sufficiently so that the detected magnitudes of the gamma radiation from at least one of the Kr-85m, Kr-87, Kr-88, Xe-133, Xe-135, Xe-135m and Xe-138 nuclides can be spectrographically determined by use of the detecting cell, the spectrograph being of sufficiently high resolution to allow such determination; and* b) *spectrographically determining the magnitude of the gamma radiation from the at least one of the Kr-85m, Kr-87, Kr-88, Xe-133, Xe-135, Xe-135m and Xe-138 nuclides in the off-gas stream by use of the detecting cell; and further including, when the magnitude of the gamma radiation from one or more of the Kr-85m, Kr-87, Kr-88, Xe-133, Xe-135, Xe-135m and Xe-138 nuclides is such as to indicate the existence of failed cladding among one or more of the fuel cells, the steps of, while the reactor and plant continue to operate:* c) reciprocating damping rods in a selected subset of the fuel cells sufficiently so as to change the rate of nuclear chain reaction of the selected subset;

d) repeating the flowing and determining steps;

e) designating other fuel cells as the selected subset and repeating steps c) and d) until the effect of the reciprocation of the damping rods in the selected subset on the spectrographically determined magnitude of the gamma radiation from the at least one of the Kr-85m, Kr-87, Kr-88, Xe-133, Xe-135, Xe-135m and Xe-138 nuclides in the off-gas stream indicates that a member cell of the selected subset exhibits failed cladding.

* * * * *